US009798571B1

(12) United States Patent
Cao et al.

(10) Patent No.: US 9,798,571 B1
(45) Date of Patent: Oct. 24, 2017

(54) SYSTEM AND METHOD FOR OPTIMIZING PROVISIONING TIME BY DYNAMICALLY CUSTOMIZING A SHARED VIRTUAL MACHINE

(71) Applicant: International Business Machines, Armonk, NY (US)

(72) Inventors: Bin Cao, Stanford, CA (US); David M. Egle, Rochester, MN (US); Daniel Hiebert, Pine Island, MN (US); Yongwen Wu, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,609

(22) Filed: Oct. 28, 2016

(51) Int. Cl.
*G06F 9/46* (2006.01)
*G06F 9/455* (2006.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,209,687 | B2 * | 6/2012 | Yuyitung | G06Q 10/06 718/1 |
| 8,789,041 | B2 | 7/2014 | Verma | |
| 2013/0275975 | A1 * | 10/2013 | Masuda | G06F 9/5077 718/1 |
| 2014/0123142 | A1 * | 5/2014 | Huh | G06F 9/5072 718/1 |
| 2014/0189685 | A1 * | 7/2014 | Kripalani | G06F 9/45533 718/1 |
| 2016/0070602 | A1 * | 3/2016 | Shimogawa | G06F 9/45558 718/1 |

FOREIGN PATENT DOCUMENTS

CN          104636189          5/2015

* cited by examiner

*Primary Examiner* — Diem Cao
(74) *Attorney, Agent, or Firm* — George R. McGuire; Bond Schoeneck & King, PLLC; John Pivnichny

(57) ABSTRACT

Technology for generating, building, maintaining and sharing a pool of virtual environments. The virtual environments (for example, virtual machines) are instantiated and active prior to a request from a user to use a virtual environments. Delta maps are used to help match the request to the best-suited active virtual environment. The delta map is a data set that indicates differences between specification values of a given active virtual environment and specification values needed to reliably fulfill the user's request.

12 Claims, 4 Drawing Sheets

SYSTEM AND METHOD FOR OPTIMIZING PROVISIONING TIME BY DYNAMICALLY CUSTOMIZING A SHARED VIRTUAL MACHINE

BACKGROUND

The present invention relates generally to the field of provisioning of virtual environments, and more particularly to provisioning (VMs) in an environment where a large groups of remote servers are networked together for centralized data storage and online access to services or resources to facilitate pooling of resources and controlling availability of pooled computing resources through virtualization technologies. One popular type of virtual environment is a virtual machine ("VM") and these two terms may be used herein somewhat interchangeably, even though "virtual environment" is potentially a broader term than "VM."

"End-to-end provisioning a VM" herein refers to the process instantiating an instantiation of a VM from an "image" and setting up user(s) to use the instantiation of the VM.

SUMMARY

A method system and/or computer program product for performing the following operations (not necessarily in the following order): (i) instantiating a plurality of virtual environments to generate a plurality of active virtual environments; (ii) for each given active virtual environment of the plurality of virtual environments, collecting a plurality of specification values characteristic of the given active virtual environment; (iii) receiving, through a communication network and on behalf of a user, a request for use of a virtual environment, with the request including information indicative of a plurality of requested specification values; and (iv) responsive to the request, for each given active virtual environment of the plurality of virtual environments, generating a delta map including information indicative of a difference between each specification value of the given active virtual environment and the requested specification value.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
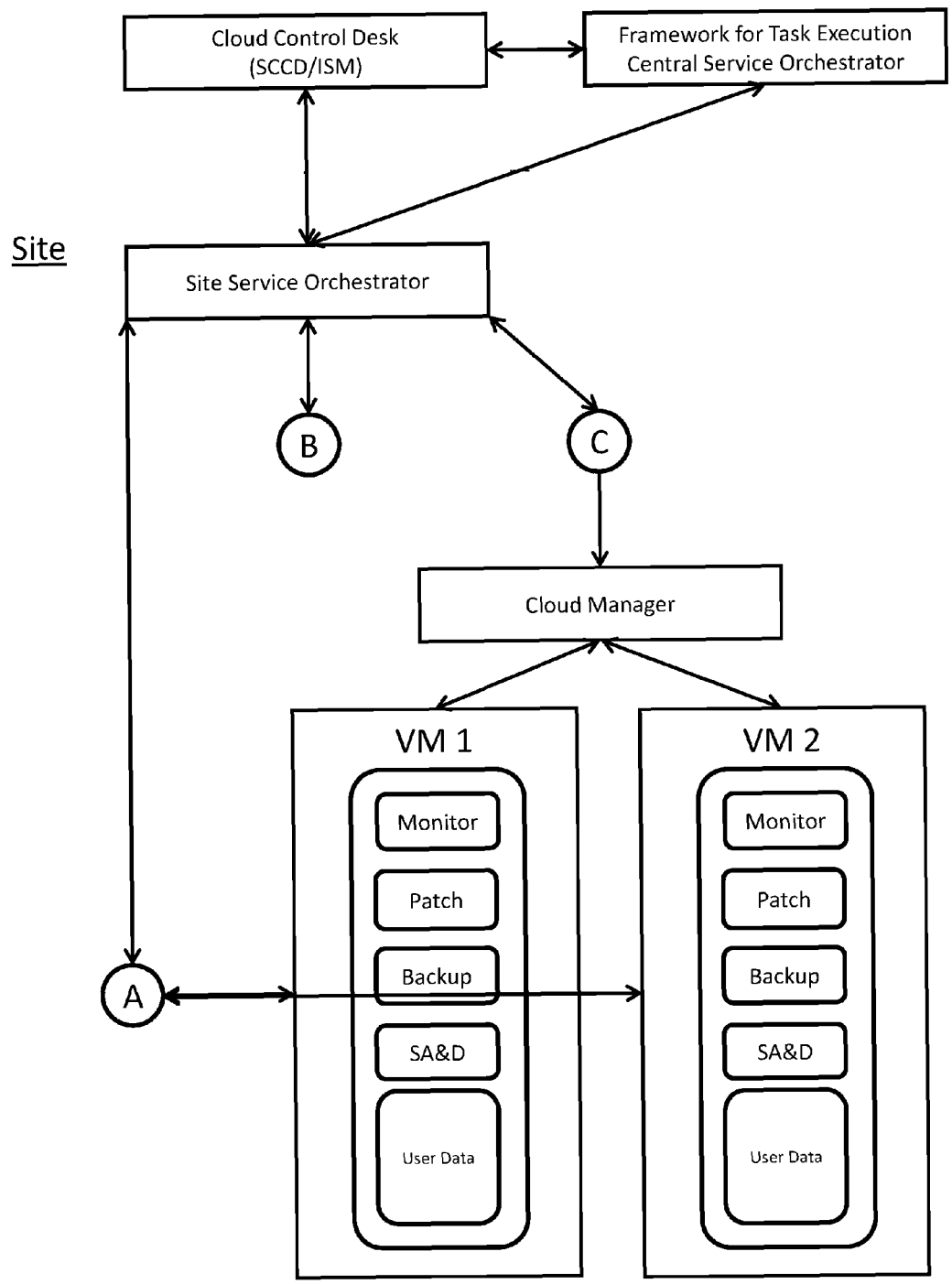
FIG. 1 is a first conceptual diagram of a non-limiting illustrative embodiment of a system for sharing a pool of virtual environments.

Referring to the Figures, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some embodiments of the present invention recognize the following facts, potential problems and/or potential areas for improvement with respect to the current state of the art: (i) the advent of cloud computing has changed the way businesses utilize computing resources within their industries; (ii) the idea of cloud managed services, including the advanced management of the virtualized endpoints (VMs), is emerging in the public, private, and hybrid cloud markets as a way to ensure the virtualized workloads meet certain operating standards; (iii) cloud managed services brings the idea of setting up services such as Anti-Virus, Backup, Disaster Recovery, Monitor, Health-Check, Patch, Security to virtualized servers to ensure their stability, security, and performance; (iv) if cloud is about "create, delete, start, stop and restart" of a VM, then cloud managed services is everything about what happens once a VM is running; (v) one of the drawbacks of provisioning cloud managed services VMs is the amount of time necessary to complete and end-to-end provision (that is, the time from when the customer requests a new VM to the time the VM has been provisioned with all cloud managed services (CMS) installed and available on it; (vi) another drawback is that newly provisioned machines must be "brought up to date" on patches, security fixes, and installed software, which is also potentially time consuming; (vii) newly provisioned virtual computing resources often have multiple "failpoints" which can negatively impact the reliability of the provisioning process; and/or (viii) there exists a need to provide available managed service VMs in a timely fashion without going through an entire end-to-end provisioning process if possible.

Some embodiments of the present invention may include one, or more, of the following features, characteristics and/or advantages: (i) avoids the need for cloning, which may not provide an adequate solution in the cloud managed services arena when VMs need to be configured to talk to multiple backend managed service providers that provide monitoring, health, patch, and discovery data; and/or (ii) avoids, or reduces, the need for reverting to a snapshot that has captured the entire state of the virtual machine at the time the snapshot is taken and can compromise the ability of a VM to continue to be up and running, with no downtime, and be up-to-date with all of the latest patches, security fixes, and software installs.

Some embodiments of the present invention deal with the provisioning of active virtual environments (for example, VMs). This is different than end-to-end provisioning from an image and should not be confused with end-to-end provisioning. Provisioning of active virtual environments will sometimes be herein referred to as "active-resource provisioning" in order to distinguish it from conventional end-to-end provisioning. In some embodiments of the present invention, delta maps are used to help accomplish active-resource provisioning.

A delta map is hereby defined as any data set that includes values corresponding to multiple delta fields, where each delta field is the difference between a specification (for example, number of CPUs, amount of memory, amount of storage, processor speed, input/output bandwidth, identity of applications installed, etc.) of an active virtual environment (sometimes herein referred to as a "timeshare") and a specification of a virtual environment requested for use on behalf of a user. Roughly speaking, the smaller the delta values in a delta map, the more suitable the corresponding active virtual environment will be considered with respect to fulfilling the request. By comparing delta requests respectively corresponding to multiple active virtual environments (sometimes herein referred to as a pool) and a common request for use, machine logic can be programmed to choose the most suitable active virtual environment in the pool. As will be explain in detail, below, even the most suitable active virtual environment may still require some degree of adjustment and/or reconfiguration so that it is fully capable of performing work on behalf of the user corresponding to the request.

Figure 2:
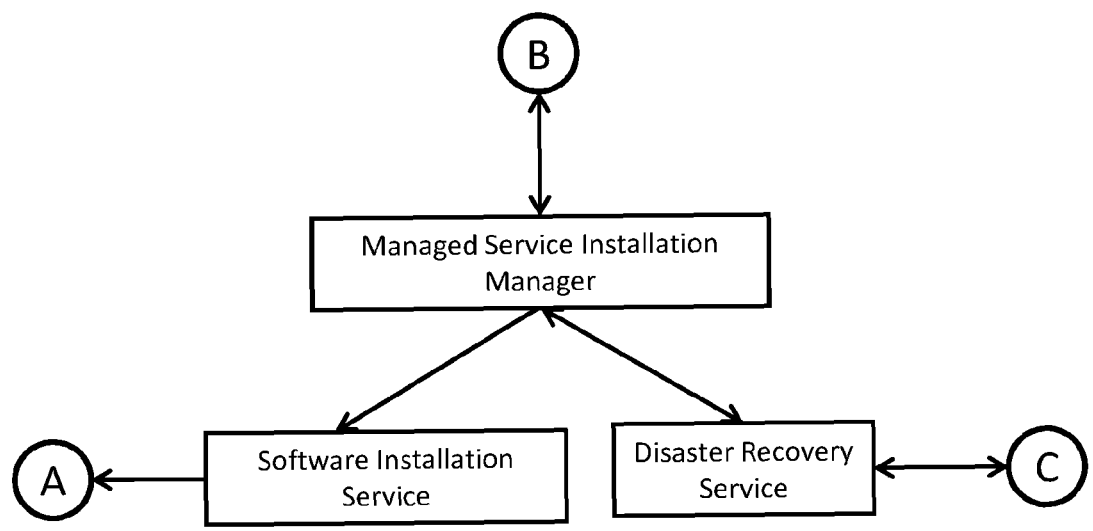
FIG. 2 is a second conceptual diagram of a non-limiting illustrative embodiment of a system for sharing a pool of virtual environments.
Figure 3:
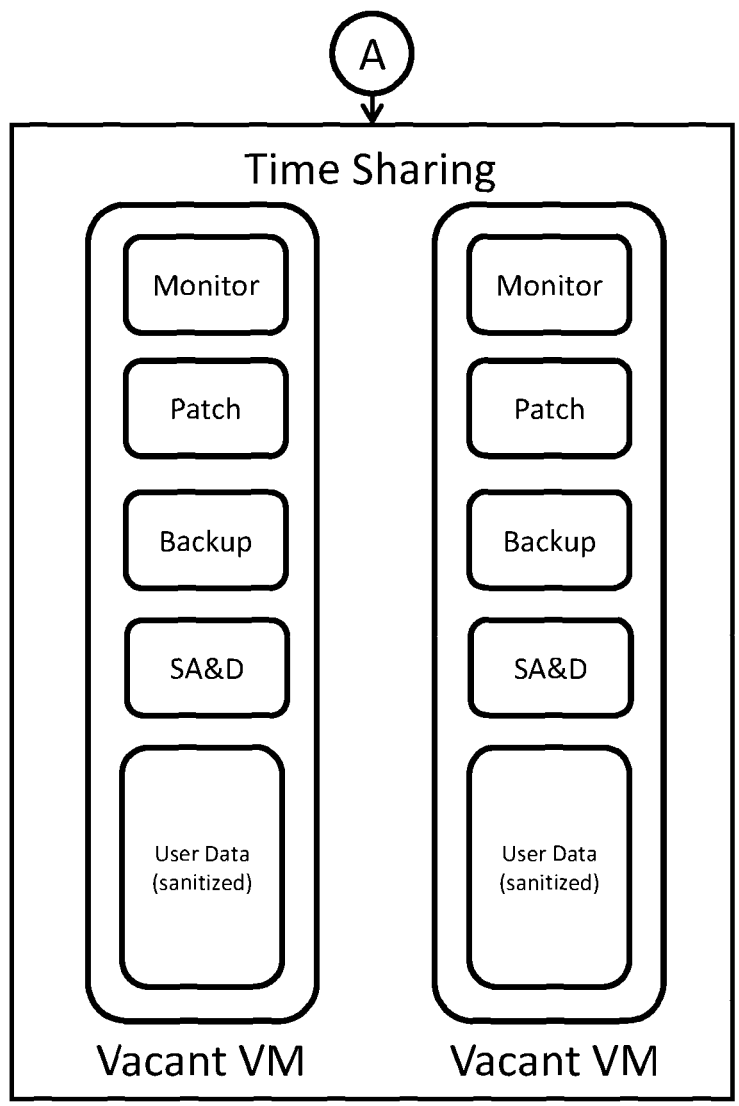
FIG. 3 is a third conceptual diagram of a non-limiting illustrative embodiment of a system for sharing a pool of virtual environments.

Referring again to the drawings, wherein like reference numerals refer to like parts throughout, there is seen in FIGS. 1-3, conceptual diagrams of a non-limiting illustrative embodiment of the system for sharing a pool of virtual environments. As shown in FIG. 1, the system is a cloud manage service platform providing a mechanism for sharing the timeshare virtual machines (VMs) based on user actions and/or requirements. The platform has central level components and site level components. In the depicted embodiment, the central level components include a control desk, an asset and service management software for managing incident processes. The central level components also includes a central service orchestrator to provide the framework for executing tasks on cloud virtual machines. Both the control desk and the central service orchestrator communicate with a site service orchestrator at the site level, which manages the creation and deployment of virtual machines for the user.

Still referring to FIG. 1, the system comprises a plurality of timeshare virtual machines (VMs), VMs according to a set of machine logic based rules defining a timeshare type scheme. The timeshare scheme controls a collection pool of VMs with common characteristics, pre-deployed and awaiting an allocation for the user at the deploy time. In the depicted embodiment, the cloud manager stores the collection pool of timeshare VMs. The timeshare VMs have been provisioned with user data related to hardware (e.g., memory, CPU, storage), added software packages and applied services.

Referring now to FIG. 2, the site service orchestrator is also in communication with a managed service installation manager and configuration management tool, such a software installation management tool. The BSS layer provides infrastructure for the user interface aspect of the system. User cans submit requests for their customized VM including requests for any hardware, software packages and services to be added. As the configuration management tool receives user requests, it is in communication with the collection pool of timeshare VMs.

Referring now to FIG. 3, there is shown a pool of timeshare VMs. Once a timeshare VM is selected to be customized, the timeshare VMs is sanitized to remove the previous user data. In the depicted embodiment, the timeshare VMs shown are wiped of user data. The level of sanitization depends on the number of shared requests between the user requests and the previous user data.

Figure 4:
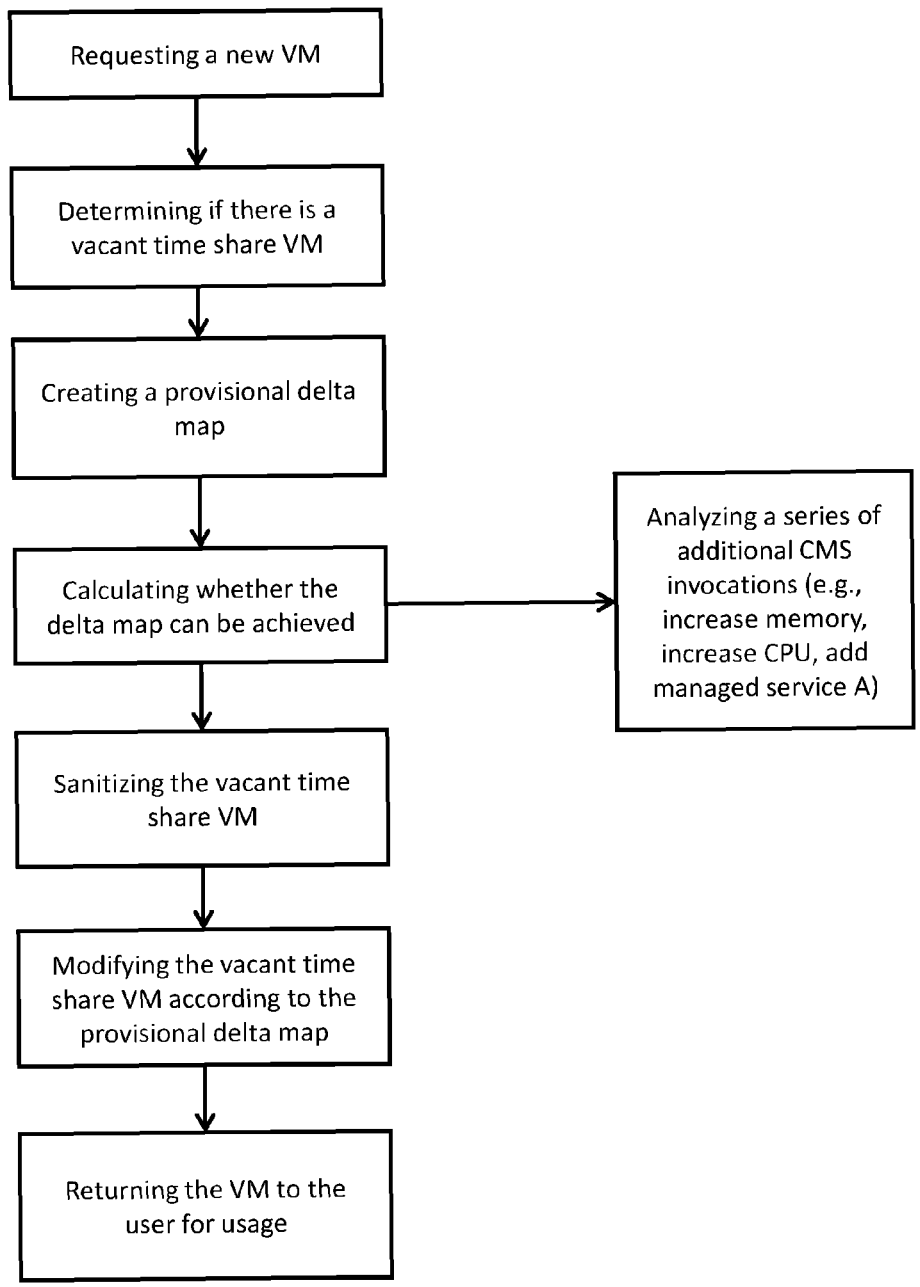
FIG. 4 is a flowchart of a non-limiting illustrative embodiment of a method for sharing a pool of virtual environments.

Referring now to FIG. 4, there is shown a flowchart of the method for sharing a pool of virtual environments. At the first step of the method, a plurality of virtual machines are allocated according to a set of machine logic based rules defining a time share type scheme. At the following step, the system receives request for a new virtual machine. Upon receiving the request, the system determines if there is a "vacant timeshare VM" at the next step. A vacant timeshare VM is a VM created prior and is now available. The vacant time share VM could also be a timeshare VM used by someone else and made available for the user.

At the following step, a machine-readable "provisional delta map" is generated if there is a vacant timeshare VM is available. The provisional delta map includes a list of user requests for their customized VM and any hardware, software packages and services added to the VM previously. For example, a user request may be a VM with 300 GB and the current VM has only 200 GB provisioned. In another example, the user request may be 8 CPUs, while the current VM only has 4 CPUs.

The delta map may also include trend data. The trend data comprises information such as a delta time and customizations varying from the original timeshare VM. The trend data is useful to minimize the time it takes to customize a timeshare VM because when the trend data reveals a popular timeshare VM configuration, that popular timeshare VM configuration can be set as the standard configuration. This would reduce the number of delta changes required to customize the timeshare VM to meet the user's requested parameters.

At the next step, the system searches through all available timeshare VMs to find the best potential match. The best potential match timeshare VM will have the most pre-programmed characteristics in common with the user requests. Thus, the best potential match timeshare VM will require the least amount of delta changes that must be made in order to customize the timeshare VM to meet the user's requested parameters. Therefore, the system minimizes the "provisioning" time as viewed by the user.

In an alternative embodiment, the method further includes the steps of calculating the delta time, the time it takes to makes the delta changes; calculating the time it takes to provision a new VM; and finally, comparing the delta time to the time it takes to provision a new VM. In the following step, the system will either provision a new VM or make the delta changes to the timeshare VM depending on which requires the least amount of time.

At the next step, once the delta changes have been determined, the system sanitizes the timeshare VM. The sanitization process may include wiping the previous user data and applications from the timeshare VM that is not included in the user's requested parameters and also providing new credentials for the timeshare VM. At the following step, the timeshare VM is modified according to the delta map. Any cloud managed services that were not part of the previous user data are added to the timeshare VM. Finally, the timeshare VM is returned to the user.

Some embodiments of the present invention: (i) include a mechanism of sharing VM(s) based on user actions/requirements by creating a common VM(s) platform; (ii) assert initial standard set of hardware configuration, managed services and installed software, that are common across the system; (iii) generate a "delta map" evaluating User Trends including deployment configuration details, software packages, post-deployment actions, and services established in field; (iv) maintain a list of all of the things the user requests (for their provision) and all of the things available on the currently provisioned time share VM; (v) retain, by the delta map, information like Hardware (Memory, CPU, Storage), Software Packages Added (via IT/infrastructure automation module(s)), and Services applied to the VM (via the IT/infrastructure automation module, etc.); (vi) generate new timeshare configuration, to be set as standard configuration to be used in the common VM platform based on delta map, delta times and customizations varying from original timeshare, if trends reveals new common platform; (vii) determine if VM deployment requests should be handled the common VM platform; and/or (viii) when a request for a VM is made by the user, the examination of the delta changes, services, or software, assuming the commonality is maintained, delta time is better the "traditional deploy time", the request can be honored, allocated via the timeshare mechanism.

In some embodiments of the present invention: (i) when a request for deploy, seems to have platform commonality (established above) (hardware, software or services) and the delta-time for deploy or the volume of requests for that particular VM, a timeshare is created and is populated with VMs of that common platform; (ii) multiple models of timeshares and VMs can be maintained depending on variance between types of requests and services. (for example, multiple configuration like 2 bedroom, 3 bedroom) some embodiments would accommodate different types timeshare configurations.

In some embodiments, sanitization of VM (returning to pool) includes the following operations: (i) use the delta map to revert back to original timeshare state; (ii) use Diff to eliminate any pollution "data" or unresolved data artifacts; (iii) if Diff>a predetermined value (for example, 25%) Trash the VM and request a new VM be deployed and added to timeshare.

Some embodiments support the aspect of "Cloud Bursting" VMs, when, say, a request of say 100 VM, is requested concurrently. These embodiments provide a mechanism to allocate, delta map and should dramatically alleviate delta time between request and availability of say 100 VMs or the maximum number of VMs in the pool.

In some embodiments, "sanitization" includes two aspects, the first (clearing of VM), delta map revert, "user data" cleanse and returning the VM to the pool. Secondarily, the timeshare may need additional renovation or sanitizing, as the delta time of VMs in timeshare pool become stale or stagnant. Either clearing the VM and re-deploying (re-building), after, say, one month of delta time in timeshare or cleaning the pool post deployment, can be run to release and replenishes VMs in timeshare in low load times on the cloud.

Some embodiments of the present invention may include one, or more, of the following features, characteristics and/or advantages: (i) virtual computing resources other than VMs (such as patterns and LINUX containers) use the timeshare type provisioning described above in connection with VMs; (ii) in case of bursting, this exercise of VM deployment would be greatly reduced in time in an allocation exercise and with minimal customizations; (iii) usage trends and delta maps can predetermine if this VM is more permanent or temporary VM; (iv) a VM based on expirations or scheduled, where the VM has somewhat of life cycle.

Some terminology will now be explained. A "request including information indicative of a plurality of requested specification values" may: (i) actually include the specification values (for example, values for number of processor(s), size of memory and/or size of storage); or (ii) the request may include information from which the specification values can be derived. For example, to illustrate how option (ii) can work, the request may include specifications about computing work that needs to be done and the speed at which that computing work needs to be done—from this information it may be possible to derive values for the specification fields needed to make the delta maps.

Some embodiments of the present invention may involve timeshares, where a single instantiation is maintained as active through a series of users over time (sometimes being returned to a pool between successive) users. Other embodiments do not involve timeshares. For example, when a delta map helps choose an active instantiation for a first user, that instantiation might be terminated after the first user is done using the active instantiation. In these embodiments, a new instantiation may be instantiated and put into the pool, either when the active instantiation is dedicated to workload of the first user, or later on (for example, when the active instantiation of the first user is terminated upon completion of the computing work of the first user).

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A computer system (CS) comprising:
    a processor(s) set;
    a storage device structured and connected to store computer code in a manner such that the computer code can be executed by the processor set; and
    stored computer code stored on the storage device;
    wherein the stored computer code includes machine readable instructions and/or data for causing the processor(s) set to perform operations including at least the following:
        instantiating a plurality of virtual environments to generate a plurality of active virtual environments;
        for each given active virtual environment of the plurality of virtual environments, collecting a plurality of specification values characteristic of the given active virtual environment;
        receiving, through a communication network and on behalf of a user, a request for use of a virtual environment, with the request including information indicative of a plurality of requested specification values;
        responsive to the request, for each given active virtual environment of the plurality of virtual environments, generating a delta map including information indicative of a difference between each specification value of the given active virtual environment and the requested specification value, wherein the delta map further includes information about an amount of time required to customize one or more of the active virtual environment of the plurality of virtual environments to the plurality of requested specification values;
        automatically determining, based at least in part on the generated delta map, a selected active virtual environment from the plurality of active virtual environments to use to fulfill the request for use of a virtual environment; and
        importing data of the user into the selected active virtual environment so that the selected active virtual environment can perform computing operations on behalf of the user.

2. The CS of claim 1 wherein the active virtual environments of the plurality of active virtual environments are virtual machines.

3. The CS of claim 1 wherein the specification values include values for at least the following specification fields: number of processors, amount of memory and amount of storage.

4. The CS of claim 1 wherein the active virtual environments of the plurality of active virtual environments are virtual machines.

5. A product comprising:
    a storage device structured and connected to store computer code in a manner such that the computer code can be executed by a processor set; and
    stored computer code stored on the storage device;

wherein the stored computer code includes machine readable instructions and/or data for causing a processor(s) set to perform operations including at least the following:

instantiating a plurality of virtual environments to generate a plurality of active virtual environments;

for each given active virtual environment of the plurality of virtual environments, collecting a plurality of specification values characteristic of the given active virtual environment;

receiving, through a communication network and on behalf of a user, a request for use of a virtual environment, with the request including information indicative of a plurality of requested specification values;

responsive to the request, for each given active virtual environment of the plurality of virtual environments, generating a delta map including information indicative of a difference between each specification value of the given active virtual environment and the requested specification value, wherein the delta map further includes information about an amount of time required to customize one or more of the active virtual environment of the plurality of virtual environments to the plurality of requested specification values;

automatically determining, based at least in part on the generated delta map, a selected active virtual environment from the plurality of active virtual environments to use to fulfill the request for use of a virtual environment; and importing data of the user into the selected active virtual environment so that the selected active virtual environment can perform computing operations on behalf of the user.

6. The product of claim 5 wherein the active virtual environments of the plurality of active virtual environments are virtual machines.

7. The product of claim 5 wherein the specification values include values for at least the following specification fields: number of processors, amount of memory and amount of storage.

8. The product of claim 5 wherein the active virtual environments of the plurality of active virtual environments are virtual machines.

9. A method comprising:

instantiating a plurality of virtual environments to generate a plurality of active virtual environments;

for each given active virtual environment of the plurality of virtual environments, collecting a plurality of specification values characteristic of the given active virtual environment;

receiving, through a communication network and on behalf of a user, a request for use of a virtual environment, with the request including information indicative of a plurality of requested specification values;

responsive to the request, for each given active virtual environment of the plurality of virtual environments, generating a delta map including information indicative of a difference between each specification value of the given active virtual environment and the requested specification value, wherein the delta map further includes information about an amount of time required to customize one or more of the active virtual environment of the plurality of virtual environments to the plurality of requested specification values;

automatically determining, based at least in part on the generated delta map, a selected active virtual environment from the plurality of active virtual environments to use to fulfill the request for use of a virtual environment; and importing data of the user into the selected active virtual environment so that the selected active virtual environment can perform computing operations on behalf of the user.

10. The method of claim 9 wherein the active virtual environments of the plurality of active virtual environments are virtual machines.

11. The method of claim 9 wherein the specification values include values for at least the following specification fields: number of processors, amount of memory and amount of storage.

12. The method of claim 1 wherein the active virtual environments of the plurality of active virtual environments are virtual machines.

* * * * *